United States Patent
Van Vlassenrode et al.

(10) Patent No.: US 11,814,852 B2
(45) Date of Patent: Nov. 14, 2023

(54) FLOOR PANEL FOR FORMING A FLOOR COVERING

(71) Applicant: FLOORING INDUSTRIES LIMITED, SARL, Bertrange (LU)

(72) Inventors: Kristof Van Vlassenrode, Deinze (BE); Filip Bossuyt, Avelgem (BE)

(73) Assignee: FLOORING INDUSTRIES LIMITED SARL, Bertrange (LU)

( * ) Notice: Subject to any disclaimer, the term of this patent is extended or adjusted under 35 U.S.C. 154(b) by 81 days.

(21) Appl. No.: 17/186,094

(22) Filed: Feb. 26, 2021

(65) Prior Publication Data

US 2021/0198902 A1    Jul. 1, 2021

Related U.S. Application Data

(63) Continuation of application No. 15/759,001, filed as application No. PCT/IB2016/055434 on Sep. 13, 2016, now Pat. No. 10,961,721.

(30) Foreign Application Priority Data

Sep. 14, 2015 (BE) .................................... 2015/5572

(51) Int. Cl.
*E04F 15/10*     (2006.01)
*B29C 43/48*     (2006.01)
(Continued)

(52) U.S. Cl.
CPC ............ *E04F 15/107* (2013.01); *B27N 3/002* (2013.01); *B27N 3/24* (2013.01); *B29C 43/28* (2013.01);
(Continued)

(58) Field of Classification Search
CPC ....... B29C 49/20; B29C 44/12; B29C 43/305; B29C 43/30; B29C 43/28; B32B 27/06;
(Continued)

(56) References Cited

U.S. PATENT DOCUMENTS 6,617,009 B1    9/2003  Chen et al.
8,840,824 B2    9/2014  Humphrey
(Continued)

FOREIGN PATENT DOCUMENTS

CN    104428475 A    3/2015
EP     1026341 A2    8/2000
(Continued)

OTHER PUBLICATIONS

International Search Report (ISR) dated Mar. 3, 2017, for PCT/IB2016/055434.
(Continued)

*Primary Examiner* — Stella K Yi
(74) *Attorney, Agent, or Firm* — WORKMAN NYDEGGER

(57) ABSTRACT

Floor panel for forming a floor covering, where the floor panel includes a carrier on the basis of a thermoplastic material and a top layer provided on the carrier. The thermoplastic material is free from plasticizers or includes a plasticizer in an amount up to maximum 20 phr, where the thermoplastic material is foamed or expanded, and where the carrier is provided with a reinforcement layer.

14 Claims, 2 Drawing Sheets

(51) Int. Cl.

| | | |
|---|---|---|
| B27N 3/00 | (2006.01) | |
| B27N 3/24 | (2006.01) | |
| B32B 5/20 | (2006.01) | |
| B32B 5/24 | (2006.01) | |
| B32B 5/32 | (2006.01) | |
| B32B 27/06 | (2006.01) | |
| B32B 27/08 | (2006.01) | |
| B32B 27/30 | (2006.01) | |
| B32B 27/40 | (2006.01) | |
| B32B 3/06 | (2006.01) | |
| B32B 37/02 | (2006.01) | |
| B29C 43/28 | (2006.01) | |
| B32B 3/04 | (2006.01) | |
| B32B 7/12 | (2006.01) | |
| B32B 27/32 | (2006.01) | |
| B29L 31/00 | (2006.01) | |
| B32B 38/14 | (2006.01) | |
| B29C 70/50 | (2006.01) | |
| B32B 37/24 | (2006.01) | |
| B32B 37/04 | (2006.01) | |
| B32B 37/10 | (2006.01) | |

(52) U.S. Cl.
CPC ........ *B29C 43/48* (2013.01); *B32B 3/04* (2013.01); *B32B 3/06* (2013.01); *B32B 5/20* (2013.01); *B32B 5/245* (2013.01); *B32B 5/32* (2013.01); *B32B 7/12* (2013.01); *B32B 27/065* (2013.01); *B32B 27/08* (2013.01); *B32B 27/304* (2013.01); *B32B 27/32* (2013.01); *B32B 27/40* (2013.01); *B32B 37/24* (2013.01); *E04F 15/105* (2013.01); *B29C 70/506* (2013.01); *B29C 2043/483* (2013.01); *B29L 2031/732* (2013.01); *B32B 37/04* (2013.01); *B32B 37/1027* (2013.01); *B32B 38/14* (2013.01); *B32B 2262/101* (2013.01); *B32B 2264/067* (2013.01); *B32B 2264/104* (2013.01); *B32B 2266/0235* (2013.01); *B32B 2307/412* (2013.01); *B32B 2307/414* (2013.01); *B32B 2307/732* (2013.01); *B32B 2317/16* (2013.01); *B32B 2471/00* (2013.01); *B32B 2607/00* (2013.01)

(58) Field of Classification Search
CPC ......... B32B 23/04; B32B 17/06; B32B 17/02; B32B 17/00; B32B 3/04; E04F 15/12; E04F 15/107
See application file for complete search history.

(56) References Cited

U.S. PATENT DOCUMENTS

| | | |
|---|---|---|
| 9,624,678 B2 | 4/2017 | Segaert et al. |
| 9,758,973 B2 | 9/2017 | Segaert et al. |
| 10,066,401 B2 | 9/2018 | Segaert et al. |
| 10,480,201 B2 | 11/2019 | Segaert et al. |
| 10,619,357 B2 | 4/2020 | Segaert et al. |
| 10,774,543 B2 | 9/2020 | Segaert et al. |
| 10,961,721 B2 | 3/2021 | Van Vlassenrode et al. |
| 11,299,893 B2 | 4/2022 | Segaert et al. |
| 2011/0167744 A1 | 7/2011 | Whipsell |
| 2013/0183506 A1 | 7/2013 | Vermeulen |
| 2015/0121793 A1 | 5/2015 | Segaert et al. |
| 2016/0144606 A1 | 5/2016 | Van Vlassenrode et al. |
| 2018/0002935 A1* | 1/2018 | Devos .......... E04F 15/105 |
| 2020/0370309 A1 | 11/2020 | Segaert et al. |
| 2021/0198902 A1 | 7/2021 | Van Vlassenrode et al. |
| 2022/0162862 A1 | 5/2022 | Segaert et al. |

FOREIGN PATENT DOCUMENTS

| | | |
|---|---|---|
| EP | 2339092 A1 | 6/2011 |
| EP | 2481848 A1 | 8/2012 |
| EP | 3459736 A2 | 3/2019 |
| EP | 3640029 A2 | 4/2020 |
| JP | S62160211 A | 7/1987 |
| WO | 9747834 A1 | 12/1997 |
| WO | 2006043893 A1 | 4/2006 |
| WO | 2008068245 A1 | 6/2008 |
| WO | 2008122668 A1 | 10/2008 |
| WO | 2009066153 A2 | 5/2009 |
| WO | 2011141849 A2 | 11/2011 |
| WO | 2011141851 A2 | 11/2011 |
| WO | 2013026559 A2 | 2/2013 |
| WO | 2013178561 A2 | 12/2013 |
| WO | 2013179260 A1 | 12/2013 |
| WO | 2013179261 A1 | 12/2013 |
| WO | 2014117887 A1 | 8/2014 |
| WO | 2015011049 A1 | 1/2015 |
| WO | 2015/152802 | 10/2015 |
| WO | 2016001859 A1 | 1/2016 |
| WO | 2016016864 A1 | 2/2016 |
| WO | 2017046693 A1 | 3/2017 |

OTHER PUBLICATIONS

Written Opinion dated Mar. 3, 2017, for PCT/IB2016/055434.
Belgium Search Report dated May 17, 2016.
IPCO, Precision Scattering Systems for Bulk Materials, ipco.com (2020).
Geng, Xiaozheng, "Twin-Screw Extruders and applications thereof", Jan. 31, 2003, pp. 392-393.
Zhang, Zhongyuan et al., "From Beginner to Master in Plastic Injection Mold Design", Aviation Industry Press, 1999, pp. 87-88.
BE Application No. BE2015/5572 filed Sep. 14, 2015, 40 pages.
U.S. Appl. No. 62/103,749, filed Jan. 15, 2015, with translation, 51 pages.
PCT Request for PCT/IB2016/055434 filed Sep. 13, 2016, 6 pages.

* cited by examiner

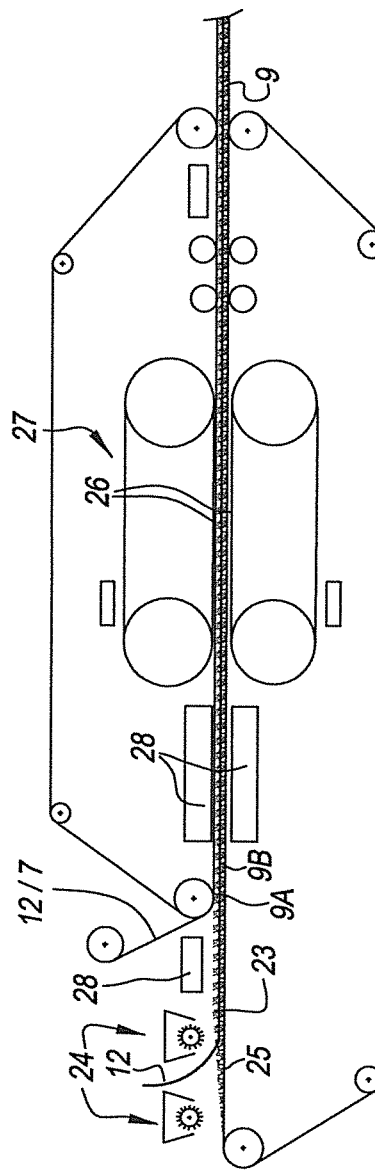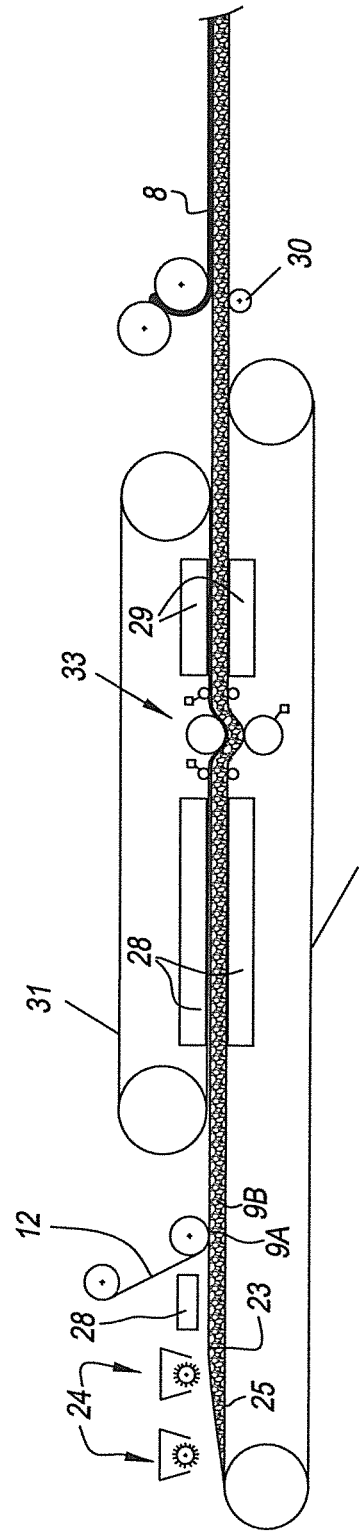

FLOOR PANEL FOR FORMING A FLOOR COVERING

CROSS REFERENCE TO RELATED APPLICATIONS

This application is a continuation application of U.S. application Ser. No. 15/759,001, filed Mar. 9, 2018, which is the national stage entry of International Application PCT/IB2016/055434, filed Sep. 13, 2016, which claims priority to Belgian application BE 2015/5572, filed Sep. 14, 2015, which are all incorporated by reference.

The present invention relates to a method for manufacturing floor panels, as well as to a floor panel for forming a floor covering.

More particularly, the present invention relates to a method for manufacturing floor panels, wherein the floor panels comprise a carrier on the basis of thermoplastic material and a top layer provided on the carrier. It is noted that by the term "thermoplastic material", a material has to be understood which comprises at least a thermoplastic synthetic material. Apart from the thermoplastic synthetic material, the thermoplastic material may also comprise fillers, such as chalk or lime, and/or additives, such as plasticizers, impact modifiers and stabilizers. It is also noted that by "a carrier on the basis of thermoplastic material" a carrier has to be understood which indeed comprises thermoplastic material, however, which does not have to consist thereof entirely or substantially. Floor panels with a carrier on the basis of thermoplastic material have the advantage that they can be made waterproof. It is also noted that by the term "carrier", the portion of the floor panels is indicated except the top layer. Thus, the carrier has a supporting function for the top layer provided thereon. The top layer which is applied on top of the carrier preferably is of a decorative nature.

Still more particularly, the invention relates to a method as described herein above, wherein the floor panels are suitable for being applied in a so-called floating floor covering. For forming such floating floor covering, the floor panels can be provided with mechanical coupling means or coupling parts on one or more of their edges. These coupling means allow coupling the floor panels to each other, and preferably they effect a horizontal as well as a vertical locking among the coupled floor panels. The coupling parts preferably are at least partially manufactured from the material of the carrier, and they may or may not make use of a separate locking element or an insert, as described as such in, amongst others, the documents WO 2006/043893 A1, WO 2008/068245 A1 and WO 2009/066153 A2.

BACKGROUND OF THE INVENTION

From the state of the art, various methods such as described herein above are known, wherein below a non-exhaustive list of such known methods will be given.

Documents U.S. Pat. No. 6,617,009 B1 and WO 2011/141849 A2 describe the application of an extrusion process for forming the thermoplastic carrier described therein. Such extrusion process, however, mostly is slow. Moreover, extruded boards or panels tend to warp. Apart therefrom, when extruding rigid thermoplastic material, there is a risk of degradation of the material. Such rigid material indeed mostly is characterized by a high melt viscosity, which during extruding may lead to a disadvantageously high friction heat. The presence of fillers, such as chalk or lime, does not help here, in view of the fact that they will further increase the melt viscosity of the thermoplastic material. The extrusion process also offers only limited possibilities for varying the composition of the carrier material across the thickness thereof. A possibility is providing empty chambers in the carrier, such as described in US '009. Although this may lead to a certain weight reduction, the thermoplastic carrier still remains quite expensive. WO '849 further describes the foaming of the thermoplastic carrier. This may result in a certain weight reduction.

From document EP 2 481 848 A1, a floor product is known which comprises two synthetic material-based semi-finished products laminated together, namely a first and a second semi-finished product. For forming the second semi-finished product, calendering and laminating techniques are applied. However, such calendering techniques mostly are expensive. Moreover, the calendering process results in floor panels with very high density. Apart therefrom, with rigid thermoplastic material, the speed of the calendering process is limited due to the mostly high melt viscosity of such material.

Document WO 2013/179261_A1 discloses the strewing of thermoplastic granulates, after which said strewn granulates are consolidated between the belts of a continuous press device. More specifically, according to WO '261 successively two layers of granulate are strewn, wherein a reinforcement layer is enclosed between these two layers. Such strewing process allows a smooth production. Such process also offers the possibility of variation in the composition of the substrate. For example, various granulates can be strewn in the successive layers. The strewing technique, such as described in WO '261, however also results in floor panels with high density.

The present invention relates in particular to a method for manufacturing floor panels, wherein the floor panels comprise a carrier on the basis of thermoplastic material and a top layer provided on the carrier; and wherein the method comprises at least the steps of strewing the thermoplastic material, for example, on an underlying transport conveyor, and consolidating the strewn thermoplastic material.

Such method is known as such from the already herein above-mentioned document WO '261, as well as, amongst others, from the documents WO 2008/122668 A1, WO 2013/179260 A1, which is related to WO '261, WO 2014/117887 A1 and WO 2015/011049 A1.

WO '668 describes a method for manufacturing laminated floor panels with a core of Wood Plastic Composite or WPC. The method comprises, amongst others, the strewing of WPC material on an underlying transport belt, after which the strewn WPC material, under the influence of pressure and temperature, is treated further and is consolidated. The WPC material is strewn in the form of granulates.

From WO '887, a method is known for manufacturing a carrier for decorative floor panels. The method comprises the strewing of a granulated thermoplastic basic material. Apart from the thermoplastic, the basic material also comprises a filler and a pore-forming agent. As an example of a pore-forming agent, an expandable microsphere is mentioned. The strewn basic material is consolidated. To this aim, as described, a double-belt press can be applied.

WO '049 discloses a method for manufacturing floor panels, which comprises the step of strewing a thermoplastic material in the form of a granulate. Thereafter, the strewn material is processed and consolidated by means of a press device.

In each of the herein above-mentioned documents WO '668. WO '260, WO '261, WO '887 and WO '049, the thermoplastic material described therein is strewn as a granulate. Such granulate is obtained by granulating an extrudate on the basis of a heated or molten dry-blend. By a dry-blend, as known as such from the state of the art, a dry, freely flowing powder has to be understood, which apart from the synthetic material also comprises additives, such as plasticizers and stabilizers, and/or fillers, such as chalk or lime. For forming the dry-blend, the synthetic material is mixed with the additives and/or the fillers, wherein the applied temperature will remain below the glass transition temperature (Tg) of the synthetic material.

When manufacturing a carrier on the basis of strewn and consolidated synthetic material granulate, obtaining a homogeneous carrier is difficult. In fact, the original synthetic material granulates rarely are completely molten again during consolidating. Moreover, the dimension of the granulate limits the minimally obtainable layer thickness. WO '260 provides the strewing of so-called micro-granulate, whereby the limit of the minimally obtainable layer thickness is lowered further. Preparing micro-granulate, however, requires special techniques. Moreover, the granulating process can alter the features of a component of the dry-blend such that the function of the component will be lost entirely or partially. Such loss of function may be, for example, the consequence of a heating of the dry-blend up into the region of or above the glass transition temperature of the respective synthetic material.

SUMMARY OF THE INVENTION

The present invention primarily aims at an alternative method for manufacturing floor panels, wherein according to various preferred embodiments solutions are offered for problems with the methods of the state of the art.

To this aim, the present invention, according to a first independent aspect, relates to a method for manufacturing floor panels, wherein the floor panels comprise a carrier on the basis of thermoplastic material and a top layer provided on the carrier; and wherein the method comprises at least the steps of strewing the thermoplastic material and consolidating the strewn thermoplastic material; with the characteristic that the thermoplastic material is strewn as a dry-blend.

Thus, the thermoplastic material is not strewn as a granulate, but as a dry-blend. Thus, in other words, it has not undergone a granulating process prior to the actual strewing. That the thermoplastic material is strewn as a dry-blend and the granulating process thus does not have to be performed, may entrain various advantages. On the one hand, a more ecological production of floor panels can be provided. The energy consumed during the granulating process thus can be economized. On the other hand, a more economical production of floor panels is allowed. Namely, a process step, namely the granulating step, can be omitted. Apart therefrom, the features of the individual components or elements of the dry-blend, such as, for example, the synthetic material, additives and/or fillers, can be guaranteed better. Also, a more homogeneous composition of the consolidated layer can be obtained. Further, by means of dry-blends very thin layers can be strewn, for example, layers having a thickness of 1 millimeter or less.

The dry-blend can be composed similarly to a dry-blend which is on the basis of a granulate to be formed, such as a dry-blend which is on the basis of an extrudate such as described herein above. The dry-blend may comprise, for example, a thermoplastic synthetic material with a (Fikentscher) K-value which is smaller than or equal to 85. For example, polyvinyl chloride (PVC) can be applied having a (Fikentscher) K-value which is smaller than or equal to 85.

Preferably, the composition of the dry-blend in fact is different from the composition of a dry-blend which is on the basis of a granulate to be formed. For forming the granulate, the last-mentioned dry-blend also is subjected to a shear treatment, for example, during the forming of the extrudate. Such shear treatment contributes to a good flow and fusion of the components of the dry-blend. In view of the fact that the dry-blend to be strewn is not processed to a granulate, such shear treatment in that case is absent. Surprisingly, it has shown that in that case still a good mixing of the components of the dry-blend can be obtained. To this end, the thermoplastic material preferably shows one or more of the following characteristics:

the thermoplastic material comprises PVC as the thermoplastic synthetic material, which preferably has a (Fikentscher) K-value which is smaller than or equal to 60;

the thermoplastic material comprises a vinyl acetate-based copolymer, such as a vinyl chloride-vinyl acetate copolymer, which preferably has a (Fikentscher) K-value which is smaller than or equal to 60, still more preferably has a (Fikentscher) K-value which is smaller than or equal to 58; and/or the thermoplastic material comprises a plasticizer, such as DOP, DINCH, DINP and/or DOTP, which preferably is present in an amount up to maximum 20 phr, and more preferably in an amount smaller than 20 phr, and still more preferably in an amount between 5 and 15 phr.

Most preferably, the thermoplastic material shows all of the herein above-mentioned characteristics. Such thermoplastic material shows a particularly good mixture between the components of the dry-blend, even in the absence of a shear treatment as described herein above.

It is also noted that the invention does not exclude that the thermoplastic material, instead of PVC, comprises another thermoplastic synthetic material, such as, for example, polyethylene, polypropylene or polyurethane, or such as, for example, a thermoplastic polyester, such as polyethylene terephthalate (PET). The thermoplastic material may also comprise a combination of two or more of the herein above-mentioned thermoplastic synthetic materials.

The thermoplastic material preferably relates to a so-called rigid thermoplastic material, which has the advantage that the risk of telegraphing of possible imperfections on an underlying surface across the floor panels can be minimized. Herein, it is advantageous that a strewing process is applied, in view of the fact that rigid material can be processed smoothly by means of a strewing process and in particular can be processed smoother than by means of an extrusion or calendering process.

Preferably, the thermoplastic material comprises a filler. The filler can be an organic filler. Example of organic fillers are wood-based fillers, such as wood particles, which wood particles in particular can relate to wood flour, wood fibers and/or wood chips. According to an alternative, the filler can be an inorganic filler, such as chalk or lime. According to still another alternative, the thermoplastic material can comprise an organic as well as an inorganic filler.

The thermoplastic material can comprise an impact modifier, preferably in an amount of 3 to 15 phr, a stabilizer, such as a Ca/Zn stabilizer, preferably in an amount of 1 to 4 phr, and/or a color pigment, such as carbon black. In the case of a color pigment, the color pigment preferably is added in liquid form to the thermoplastic material. The inventor in fact has found that color pigments in liquid form can be smoothly blended into a dry-blend.

In particular, the thermoplastic material can comprise separate glass fibers, as described as such in WO '260.

It is also noted that the invention does not exclude that the carrier relates to a multi-layered carrier. In the case of a multi-layered carrier, at least one layer of the carrier is realized on the basis of the thermoplastic material, as described herein above, herein below called the layer strewn as a dry-blend. The one or more remaining layers can also be made on the basis of thermoplastic material and can be formed in any manner. So, a remaining layer can be formed by means of strewing, extrusion, calendering and/or coating techniques. If a strewing process is applied for forming a remaining layer, the material of this remaining layer can be strewn in any form, for example, as a dry-blend or as a granulate. According to another example, one or more of the remaining layers can be extruded online or offline with the strewing process of the layer strewn as a dry-blend. In any case, the one or more remaining layers are adhered to the layer strewn as a dry-blend preferably by means of a thermal lamination process, for example, in that the layer strewn as a dry-blend is consolidated together with or in the presence of the material of the one or more remaining layers, or in that the consolidated layer strewn as a dry-blend is thermally laminated to the one or more remaining layers, or in that the one or more remaining layers are formed on the consolidated layer strewn as a dry-blend.

Preferably, the method according to the first aspect also comprises the step of foaming the thermoplastic material, and the thermoplastic material to this end is provided with a blowing or foaming agent. This preferred embodiment of the method according to the first aspect offers the advantage that a particularly good foaming of the carrier can be obtained. The inventor in fact has found that, as the thermoplastic material is strewn as a dry-blend, the features of the blowing agent incorporated into the dry-blend can be guaranteed such that a very good foaming of the thermoplastic material is obtained. Consequently, the method according to the first aspect allows reducing the density of the carrier, such that an economization of raw materials and energy can be realized, as well as new features can be effected, such as comfort and dimensional stability.

The step of foaming the thermoplastic material preferably is performed after the step of strewing the thermoplastic material; however, foaming does not have to take place immediately after strewing. Most preferably, the step of foaming is performed during the step of consolidating the strewn thermoplastic material. The inventor in fact has found that the conditions during consolidating are excellently suitable for performing the foaming process. That the thermoplastic material is foamed during the consolidation process, further offers the possibility of an energy-efficient foaming. The foaming and consolidating process in fact can be performed in one and the same device, for example, a preferably heated press device. Moreover, such press device can calibrate the obtained thickness of the foamed layer.

The blowing agent preferably relates to a chemical blowing agent, for example, azoisobutyronitrile or azodicarbonamide. Although the use of a chemical blowing agent for foaming polymer materials is known as such, for example, in an extrusion or injection molding process, the inventor has found that such chemical blowing agent also provides for an excellent foaming when it is integrated into a dry-blend to be strewn. Apart therefrom, it is apparent that such chemical blowing agent behaves excellently in conditions which are typical for the consolidating process subsequent to strewing.

Still preferably, the blowing agent relates to an expandable microsphere. The use of such microsphere as a blowing agent is known as such from, amongst others, the documents WO 2013/178561 A2 and WO '887. However, the inventor has found that embedding such microsphere in a dry-blend to be strewn can be extremely advantageous. The dry-blend to be strewn in fact provides for that the features of the microsphere can be guaranteed such that a very good foaming of the thermoplastic material is effected. The risk of degradation of the expandable microsphere, for example, as a result of a granulating process, can be minimized, for example. Such microsphere comprises a preferably thermoplastic covering which encloses a gas, more particularly butane or pentane. When they are heated, for example, during the consolidation process, due to the gas the internal pressure will rise and at the same time the covering becomes softer, resulting in a significant expansion of the microspheres.

According to another preferred embodiment of the method according to the first aspect, the thermoplastic material comprises a density-reducing filler, such as perlite, vermiculite and/or silicate. Here, this relates in particular to an expanded, foamed, porous or hollow filler. In the case of an expanded filler, here a filler is intended which is already expanded prior to being added to the dry-blend. In particular, the expanded filler relates to an already expanded microsphere.

According to an alternative, the blowing agent relates to a physical blowing agent.

It is also noted that two or more of the herein above-described blowing agents can be combined.

Preferably, when applying a blowing agent, or with foaming in general, at least a weight reduction of 40%, more preferably at least a weight reduction of 50%, and still more preferably at least a weight reduction of 75% is obtained, wherein it even has proven possible to achieve a weight reduction of at least 100%.

The step of consolidating of the strewn thermoplastic material preferably is performed under the influence of pressure and/or temperature. To this aim, a preferably heated press device can be applied. The press device relates in particular to a belt press, such a, for example, a double-belt press. The press device may relate to an isobaric press.

The method according to the first aspect preferably also comprises the step of providing the carrier with a reinforcement layer, more particularly a glass fiber cloth or glass fleece. The reinforcement layer can increase the dimensional stability of the floor panels, which is desirable with floor panels on the basis of a thermoplastic material. Such floor panels in fact may be subject to considerable shrinkage or expansion. Apart therefrom, it is noted that the method offers a smooth possibility for enclosing or embedding a reinforcement layer into a carrier on the basis of foamed thermoplastic material.

Preferably, the step of providing the reinforcement layer takes place prior to the step of consolidating the thermoplastic material. A good embedding of the reinforcement layer then can be effected in the consolidating process. However, it is not excluded that, in the case that the reinforcement layer is provided on the thermoplastic material, this thermoplastic material already has been compressed or pressed.

According to a particular embodiment, the reinforcement layer is provided such that, during consolidating by means of a press device, it is directly supported by a press element, such as a press platen or a pressing belt. This manner of providing the reinforcement layer is described as such in the document with the application number U.S. Ser. No. 14/549, 153 and can minimize the risk of deforming the reinforcement layer or of damaging the reinforcement layer during the press treatment.

According to an alternative embodiment, the reinforcement layer, in the case of a multi-layered carrier, is provided between two layers prior to consolidation of these layers, as described as such in WO '261. Preferably, the reinforcement layer thus is provided between two layers which are strewn and/or foamed. In such case preferably at least one, and still better both, of these layers are strewn as a dry-blend. Strewing as a dry-blend provides for good embedding of the reinforcement layer, whereas still a high weight reduction by means of foaming can be achieved.

In particular, a plastisol can be provided on the aforementioned reinforcement layer, as described as such in PCT/IB2015/054964. So, an excellent adherence of the reinforcement layer in the carrier can be effected. The plastisol preferably relates to a suspension of PVC particles in liquid plasticizer.

It is also noted that the present invention does not exclude that the carrier is provided with a plurality of reinforcement layers, in particularly a plurality of glass fiber cloths or glass fleeces.

The carrier preferably has a thickness of at least 3 millimeters, more preferably a thickness of at least 4 millimeters, and still more preferably a thickness of at least 4.5 millimeters. Such thickness of the carrier reduces the risk of telegraphing of possible imperfections on an underlying surface across the floor panels. This risk is reduced even more as the carrier also comprises a thermoplastic material of the rigid type.

The carrier may also be calibrated, for example, by means of a roller. The roller may relate to an S-roller. The calibrating step may be applied, for example, for calibrating the foamed carrier.

It is also noted that in the case of a multi-layered carrier at least one layer of the carrier is realized on the basis of a thermoplastic material, such as described herein above, whereas the material of the one or more remaining layers may show one or more of the characteristics of the herein above-mentioned thermoplastic material. The plurality of layers of the carrier may or may not have been made equal to each other.

According to a preferred embodiment of the method according to the first aspect, the method also comprises the step of providing the carrier with a counter layer on the basis of a thermoplastic material, which is softer than the aforementioned thermoplastic material strewn as a dry-blend. It is noted that by the term "counter layer" a layer is intended which is provided underneath the aforementioned thermoplastic material strewn as a dry-blend, however, does not necessary have to be directly adjacent thereto. As the thermoplastic material of the counter layer should be softer than the aforementioned material strewn as a dry-blend, the thermoplastic material of the counter layer may comprise more plasticizer. Preferably, the thermoplastic material of the counter layer comprises plasticizer in an amount of minimum 20 phr, still more preferably in an amount larger than 20 phr. The rather soft counter layer may provide new features for the floor panels, such as comfort or sound adsorption, and forms in particular a layer with acoustic features, such as reducing the noise production of the floor panels, for example, when the floor panels are being walked on. The thermoplastic material of the counter layer may or may not comprise the same thermoplastic synthetic material as the thermoplastic material strewn as a dry-blend. The thermoplastic synthetic material of the counter layer may relate, for example, to PVC, preferably PVC of the soft or supple type. The thermoplastic material of the counter layer can be foamed and to this aim can be provided with one or more of the blowing agents already described herein above.

The step of providing the carrier with the counter layer preferably is performed in-line with the already above-mentioned steps of strewing and consolidating the material strewn as a dry-blend. Although the counter layer preferably is applied prior to consolidating the material strewn as a dry-blend, wherein the counter layer then can be bonded to the material strewn as a dry-blend during the consolidating process, the invention does not exclude that the counter layer is provided on the already compressed and pressed material strewn as a dry-blend.

Most preferably, the step of providing the counter layer comprises strewing the thermoplastic material of the counter layer and consolidating the strewn thermoplastic material of the counter layer. Moreover, consolidating the strewn thermoplastic material of the counter layer preferably is performed during the step of consolidating the thermoplastic material strewn as a dry-blend. This offers the advantage that providing the counter layer simply can be integrated into the herein-above described method. For example, only an additional strewing device has to be provided, which then performs the strewing of the thermoplastic material of the counter layer. The thermoplastic material of the counter layer can be strewn as a dry-blend, however, can also be strewn in any other form, for example, as a granulate.

The aforementioned steps of the method according to the first aspect preferably are performed as a continuous process.

It is also noted that applying a strewing process for foaming a carrier on the basis of rigid thermoplastic material as such forms an independent inventive idea of the invention, independent of the characteristic that the thermoplastic material is strewn as a dry-blend. A carrier on the basis of foamed, rigid thermoplastic material offers the advantage that particularly stable and economical floor panels can be obtained, wherein moreover the risk of telegraphing of possible imperfections on an underlying surface across the floor panels can be minimized. Apart therefrom, the strewing and consolidating process allows manufacturing such floor panels in a particularly efficient manner, in view of the fact that the strewing process, on the one hand, allows a smooth processing of rigid thermoplastic materials and, on the other hand, provides excellent conditions for foaming the thermoplastic material.

Thus, the present invention, according to an independent second aspect thereof, relates to a method for manufacturing floor panels, wherein the floor panels comprise a carrier on the basis of thermoplastic material, and a top layer provided on the carrier; with the characteristic that the method comprises at least the steps of strewing the thermoplastic material and consolidating the strewn thermoplastic material; that the method also comprises the step of foaming the thermoplastic material and the thermoplastic material to this aim is provided with a blowing agent; and that the thermoplastic material comprises a plasticizer in an amount of maximum 20 phr, preferably in an amount smaller than 20 phr, and still more preferably in an amount between 5 and 15 phr.

In a particularly preferred embodiment of the method according to the second aspect, the method also comprises the step of providing the carrier with a reinforcement layer, more particularly a glass fiber cloth or glass fleece. A carrier manufactured in this manner allows obtaining an extremely stable floor panel.

It is also noted that the herein-above described second aspect of the invention can be combined with one or more of the characteristics which are described herein above within the scope of the first aspect, independent of the characteristic that the thermoplastic material is strewn as a dry-blend.

It is also noted that applying a strewing process for foaming a carrier on the basis of thermoplastic material by means of a chemical blowing agent forms a further independent inventive idea of the invention. Thus, the present invention, according to an independent third aspect thereof, also relates to a method for manufacturing floor panels, wherein the floor panels comprise a carrier on the basis of thermoplastic material and a top layer provided on the carrier, with the characteristic that the method comprises at least the steps of strewing the thermoplastic material and consolidating the strewn thermoplastic material; that the method also comprises the step of foaming the thermoplastic material, and the thermoplastic material to this aim is provided with a blowing agent; and that the blowing agent relates to a chemical blowing agent. Although the use of a chemical blowing agent for foaming polymer materials is known as such, for example, in an extrusion or injection molding process, the inventor has found that such chemical blowing agent also provides for an excellent foaming when said blowing agent is applied in a strewing process. Apart therefrom, it has shown that such chemical blowing agent behaves excellently in conditions which are typical for the consolidating process subsequent to strewing.

It is also noted that the third aspect of the invention can be combined with one or more of the characteristics which are described herein above within the scope of the first aspect, independent of the characteristic that the thermoplastic material is strewn as a dry-blend.

Of course, the carrier, as described herein above in the method of the first, the second and the third aspect, still has to be processed with other material, whether or not in layers, for forming the final floor panels. Generally, this further treatment can take place according to various manners, wherein, for connecting the other material to the carrier, various processes can be applied, such as, amongst others, laminating and coating processes.

According to a first possibility, by means of heat and pressure the carrier, at least on the surface, is fused together with one or more further layers, such as a printed decor film and/or a wear layer and/or a further thermoplastic layer. According to a second possibility, the material of one or more further layers, in particular one or more further thermoplastic layers, can be applied in liquid or pasty form by calendering them or providing them on the carrier in any other manner. According to a third possibility, one or more further layers are bonded to the carrier by means of an adhesive agent or glue.

The top layer preferably comprises at least a decor and a transparent or translucent wear layer situated on top of the decor.

The decor of the top layer preferably comprises a motif or pattern, more particularly a wood motif or wood pattern, which is realized in form of a print on a synthetic material film, for example, a polyvinyl chloride film, a polyurethane film, a polypropylene film or a polyethylene film. Such decor preferably is bonded to the carrier by means of a thermal laminating process, whether or not together with one or more remaining layers of the top layer, such as the wear layer. Herein, the decor can be provided and laminated onto the carrier as a continuous film, as described as such in PCT/IB2015/055826. In the case of such laminating process, preferably an isobaric press is applied, as described as such in PCT/IB2015/055826.

According to an alternative, however, also preferred embodiment, the decor is provided directly on the carrier, or on a basic layer or primer provided on the carrier. Here, this relates to a decor indicated by the English term "direct print" or by the German term "Direktdruck". Herein, a printer can be applied, preferably a digital printer.

According to another alternative, the decor can be provided as a print on the underside of the wear layer.

The wear layer preferably is a synthetic material-based wear layer, which either is provided as a film, whether or not together with said printed film, for example, by means of a thermal laminating process, or is applied in liquid condition and subsequently is solidified on the carrier. In the case that the wear layer comprises a film, this preferably relates to a thermoplastic film, in particularly a polyvinyl chloride film, a polyurethane film, a polypropylene film or a polyethylene film.

Preferably, the top layer comprises a thermoplastic backing layer. It is noted that by the term "thermoplastic backing layer", a backing layer is meant which is realized on the basis of a thermoplastic material. The thermoplastic backing layer may be fused together with the carrier under the influence of pressure and temperature, whether or not together with the herein above-mentioned film and/or the wear layer, or may be applied in liquid or pasty form by calendering it or providing it on the carrier in any other manner.

The thermoplastic backing layer preferably is provided on the carrier as a not-strewn layer, preferably after the thermoplastic material of the carrier is consolidated. In that the thermoplastic backing layer is provided in a different manner than the earlier-mentioned thermoplastic material, a greater freedom in view of the process configuration is obtained, wherein strewn and not-strewn layers can be combined in an advantageous manner. Preferably, the thermoplastic backing layer is provided in the form of a sheet or film, more particularly by means of calendering. According to an alternative, the backing layer can be applied by means of an adhesive agent or glue, or also by means of thermal lamination.

The thermoplastic backing layer can show one or more of the following characteristics:
- the backing layer comprises a supple or soft thermoplastic, more particularly a thermoplastic which is provided with one or more plasticizers;
- the backing layer is based on one or a combination of two or more of the following materials: polyvinyl chloride or PVC, polyethylene, polypropylene and/or polyurethane;
- the backing layer comprises one or more inorganic fillers, such as, for example, chalk and/or lime; and/or
- the backing layer comprises a composite of a thermoplastic and one or more organic fillers, such as, for example, wood particles, wherein the backing layer more particularly relates to Wood Plastic Composite or WPC, wherein for the thermoplastic preferably use is made of any of the herein above-mentioned thermoplastics.

That a supple backing layer is applied, i.e. a backing layer with a supple thermoplastic, for example, soft or supple PVC, has the advantage that the floor panels can be provided with a certain flexibility. Such flexibility can contribute to the ease of installation of the floor panels, as well as, for example, to a reduction of the noise production of the floor panels, for example, when the floor panels are being walked on. Preferably, the thermoplastic material of the backing layer comprises a plasticizer in an amount of maximum 20 phr, and more particularly in an amount larger than 20 phr.

Herein, it is also noted that the composition of the thermoplastic material of the backing layer may or may not be equal to the composition of the herein-above mentioned thermoplastic material which is strewn as a dry-blend, independent of the manner in which the backing layer is applied, however, preferably is different therefrom.

The top layer can be finished with a lacquer layer, which is provided on said wear layer and/or said decor as a liquid layer and subsequently has solidified. Preferably, this relates to a lacquer layer which can be solidified by UV light or excimer radiation. Preferably, a lacquer layer is provided on top of the possible wear layer.

In a particular embodiment, the top layer is realized such as the first semi-finished product described in EP 2 481 848 A1, wherein this first semi-finished product is combined with the carrier as described herein above, by means of laminating.

Although the top layer preferably is applied after the carrier is formed or consolidated, the invention does not exclude that the top layer is entirely or partially provided before the carrier is formed. So, one or more layers of the top layer can be applied prior to consolidating the carrier and subsequently can be bonded to the carrier during the consolidating process.

The top layer can also be provided with embossments, which may or may not be performed in register with the possibly present decor. To this aim, a roller can be applied, as described as such in PCT/IB2015/055826. The embossments provide the floor panels with a relief, such that they can simulate a real wood structure even better. The embossments can be performed, for example, according to a wood nerve pattern.

According to the invention, it is possible that the carrier, whether or not together with still other layers, forms a material web from which floor panels are obtained by dividing, more particularly by cutting, to preferably oblong rectangular or square floor panels.

Preferably, the invention according to its first, its second and its third aspect is applied for manufacturing floor panels which, on at least two opposite edges, are provided with mechanical coupling means, more particularly coupling parts, which allow that two of such floor panels can be coupled to each other in such a manner that a locking is obtained in a vertical direction perpendicular to the plane of the coupled panels as well as in a horizontal direction perpendicular to the coupled edges and in the plane of the floor panels.

Preferably, the coupling means show one or a combination of the following characteristics:

- the characteristic that the mechanical coupling means or coupling parts substantially are realized as a tongue and a groove bordered by an upper lip and a lower lip, wherein this tongue and groove are substantially responsible for the locking in said vertical direction, and wherein the tongue and the groove are provided with additional locking parts, substantially responsible for the locking in said horizontal direction. Preferably, the locking parts comprise a protrusion on the underside of the tongue and a recess in the lower lip of the groove. Such coupling means and locking parts are known, for example, from WO 97/47834;
- the characteristic that the mechanical coupling means or coupling parts press the coupled floor panels against each other, for example, in that these mechanical coupling means are realized with a so-called pretension, as known as such from EP 1 026 341. The tensioning force with which the floor panels are pressed against each other or towards each other may be obtained, for example, in combination with the above-mentioned characteristic, by means of a lower lip bent out in coupled position, which, in trying to spring back, presses against the underside of the tongue;
- the characteristic that the mechanical coupling means allow a coupling by means of a horizontal, or quasi-horizontal, shifting movement of the panels towards each other;
- the characteristic that the mechanical coupling means allow a coupling by means of a turning movement along the respective edges;
- the characteristic that the mechanical coupling means allow a coupling by means of a downward-directed movement of a male coupling part, for example, with a tongue, up into a female coupling part, for example, with a groove, preferably in order to install such panels according to the so-called "Fold-down" principle;
- the characteristic that the mechanical coupling means, or at least the pertaining upper edge, is realized by means of a milling treatment with rotating milling tools; and/or
- the characteristic that the mechanical coupling parts make use of a separate locking element or an insert, as described as such in, amongst others, the documents WO 2006/043893 A1, WO 2008/068245 A1 and WO 2009/066153 A2.

Preferably, the aforementioned coupling means or coupling parts, or at least a part of the coupling means or coupling parts, are provided in the material of the carrier, more particularly by means of a milling treatment with rotating milling tools. In particularly, the coupling means are realized at least partially in the herein above-described thermoplastic material strewn as a dry-blend, which shows excellent features for this purpose.

The floor panels preferably relate to oblong rectangular or square floor panels, which on their both pairs of opposite edges are provided with coupling means or coupling parts, as described herein above.

However, it is not excluded that the floor panels at their edges are free from coupling means or coupling parts, wherein these floor panels then are intended for being glued with their underside on an underlying surface or for being loosely installed.

Further, the present invention also relates to a floor panel for forming a floor covering, with the characteristic that the floor panel is obtained from the method according to the herein above-described first, second and/or third aspect.

It is also noted that the invention also relates to a carrier material which is obtained or can be obtained as a semi-finished product of a method according to any of the above-mentioned aspects or the preferred embodiments thereof, wherein this carrier material is suitable for manufacturing floor panels. More particularly, this relates to a semi-finished product which is free from a top layer.

It is also noted that the various aspects described herein above can be combined at choice. In particular, each characteristic or combination of characteristics of one aspect can be combined at choice with any characteristic or combination of characteristics of one or more other aspects, as far as these characteristics are not contradictory.

It is also noted that the herein above-described method of the first, second and/or third aspect also can be applied for manufacturing panels in general and in other words is not limited to the manufacture of floor panels. So, the method may also be employed for manufacturing of, for example, wall panels, furniture panels and the like.

The present invention further also relates to a floor panel for forming a floor covering, wherein the floor panel comprises a carrier on the basis of a thermoplastic material and a top layer provided on the carrier, with the characteristic that the thermoplastic material comprises a plasticizer in an amount up to maximum 20 phr, preferably in an amount smaller than 20 phr, and still more preferably in an amount between 5 and 15 phr; that the thermoplastic material is foamed or expanded; and that the carrier is provided with a reinforcement layer, more particularly a glass fiber cloth or glass fleece. Hereby, the invention offers the advantage that an extremely comfortable, stable and economically advantageous floor panel can be provided, and that moreover the risk of telegraphing of possible imperfections on an underlying surface across the floor panels is minimized. It is also noted that the floor panel, the carrier and the top layer can be realized according to one or more of the characteristics of the herein above-described first, second and third aspect of the invention, independently from the application of a strewing process on the basis of a dry-blend, a strewing process in general or a chemical blowing agent.

BRIEF DESCRIPTION OF THE DRAWINGS

With the intention of better showing the characteristics of the invention, herein below, as an example without any limitative character, some preferred embodiments are described, with reference to the accompanying drawings, wherein:

FIG. 3 schematically shows some steps of a method according to the invention, wherein the method can be applied for manufacturing the floor panels from FIGS. 1 and 2; and FIG. 4 schematically represents some steps of an alternative method according to the invention.

DETAILED DESCRIPTION OF THE INVENTION

Figure 1:
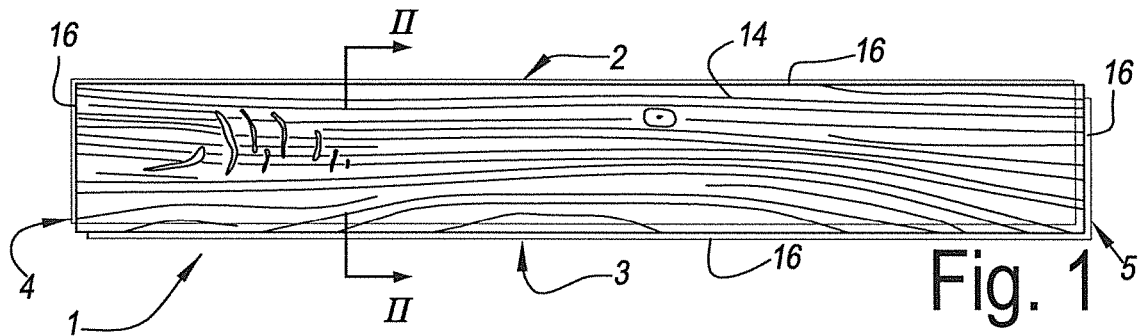
FIG. 1 represents a floor panel according to the invention.

FIG. 1 represents a floor panel 1 according to the invention. In the example, the floor panel 1 is rectangular and oblong and comprises a pair of long sides 2-3 and a pair of short sides 4-5.

Figure 2:
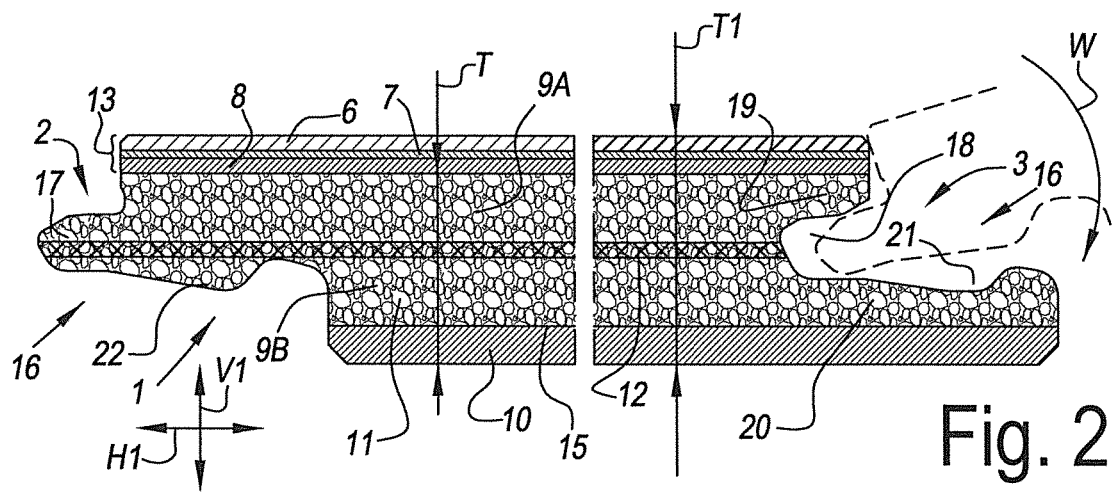
FIG. 2, at a larger scale, represents a cross-section according to the line II-II in FIG. 1.

FIG. 2 represents a cross-section according to the line II-II in FIG. 1. From the cross-section, it is clear that floor panel 1 is composed of a, in this case multi-layered, carrier 11 and a top layer 13 provided on the carrier 11. The carrier 11 is realized on the basis of thermoplastic material.

The carrier 11 here comprises two layers 9A and 9B, which both are realized on the basis of thermoplastic material. Both layers 9A and 9B comprise a strewn and pressed dry-blend. The thermoplastic material of at least one of the layers 9A-9B, and preferably of both layers 9A-9B, shows the following characteristics:

- the thermoplastic material comprises PVC as a thermoplastic synthetic material, with a (Fikentscher) K-value which is smaller than or equal to 60;
- the thermoplastic material comprises a vinyl acetate-based copolymer, such as a vinyl chloride-vinyl acetate copolymer, with a (Fikentscher) K-value which is smaller than or equal to 58;
- the thermoplastic material comprises a plasticizer, namely DOTP, which is present in an amount between 5 and 15 phr;
- the thermoplastic material comprises an impact modifier in an amount of 3 to 15 phr;
- the thermoplastic material comprises a stabilizer, such as a Ca/Zn stabilizer, in an amount of 1 to 4 phr; and
- the thermoplastic material comprises a color pigment, such as carbon black, which is added to the thermoplastic material in liquid form.

The layers 9A and/or 9B are foamed, wherein the foaming of the layers can be performed such as described in the introduction.

Further, the carrier 11 comprises a glass fiber fleece 12, which in the example is enclosed in between the layers 9A-9B.

The carrier 11 further also comprises a counter layer 10, which is provided on the underside 15 of the layer 9B and also is realized on the basis of PVC. In particular, this relates to PVC of the soft or supple type. The counter layer 10 is optional and it is, for example, possible that one of the layers 9A-9B, namely the lowermost layer 9B, forms the underside of the carrier 11 and thus also the underside of the floor panel 1.

The top layer 13 provided on the carrier 11 comprises a printed decor film 7 and a transparent wear layer 6 on the basis of thermoplastic material. The top layer 13 further also comprises a thermoplastic backing layer 8 situated underneath the decor film 7. In the example, the backing layer 8, the decor film 7 as well as the wear layer 6 are realized on the basis of PVC. Herein, the backing layer preferably is realized on the basis of soft or supple PVC.

In the example, the decor film 7 is provided with a print with a wood pattern 14, wherein per floor panel 1 each time the image of a single wooden plank is provided.

FIG. 2 further also represents that the carrier 11 has a thickness T which forms at least 40 percent, and here even more than half of the thickness T1 of the floor panel 1.

Further, the floor panel 1 of the example is provided with mechanical coupling means or coupling parts 16 on both opposite edges 2-3. FIG. 2 shows that at least the mechanical coupling parts 16 on the long pair of edges 2-3 allow that two of such floor panels 1 can be coupled to each other, such that a locking is created in a vertical direction V1 perpendicular to the plane of the coupled floor panels 1, as well as in a horizontal direction H1 perpendicular to the coupled edges 2-3 and in the plane of the floor panels 1. The illustrated coupling means 16 show the feature that they are substantially realized as a tongue 17 and a groove 18 bordered by an upper lip 19 and a lower lip 20, wherein this tongue 17 and groove 18 are substantially responsible for the locking in said vertical direction V1, and wherein the tongue 17 and the groove 18 are provided with additional locking parts 21-22, substantially responsible for the locking in said horizontal direction H1. In this case, the locking parts comprise a protrusion 21 on the underside of the tongue 17 and a cooperating therewith recess 22 in the lower lip 20. The coupling means 16 represented here allow at least a coupling by means of a turning movement W along the respective edges 2-3. The mechanical coupling means 16 are substantially realized in the layers 9A-9B, which enclose the glass fiber layer 12. In the example, they are provided by means of a milling treatment, for example, by means of rotating tools.

FIG. 3 represents some steps of a method according to the invention. The method can be applied for manufacturing the floor panel 1 from FIGS. 1 and 2. In particular, some steps are represented for forming the carrier 11.

For forming the layers 9A-9B, strewing devices 24 are applied which perform the strewing of the dry-blend 23 of which the layers 9A-9B are composed. The strewing devices 24 deposit the dry-blend 23 of the layer 9B and the layer 9A, respectively, on a transport device 25 and the glass fiber layer 12, which can be supplied to the layer 9B, for example, from a roll.

Subsequently, the strewn dry-blend 23 is consolidated between the belts 26 of a continuous press device 27 under the influence of pressure and temperature. Hereby, the dry-blend 23 is fed along one or more heating devices 28 and possibly can be cooled again after the press treatment or at the end of the press treatment. By cooling, it is obtained that the pressed plates, sheets or layers are relatively fast in a manageable condition for further processing.

The dry-blend 23 of the layers 9A and/or 9B can be foamed and to this end can be provided with a blowing agent, which may relate to a chemical blowing agent and/or an expandable microsphere. For the foaming of the layers 9A-9B, or at least the partial foaming thereof, the press device 27 as well as the heating devices 28 can be applied.

FIG. 3 further also represents that simultaneously with pressing, a further layer, in this case at least the decor film 7, can be provided or integrated by supplying this on the dry-blend 23 in the press treatment. Instead of a decor film, this may also relate, for example, to an extra glass fiber layer 12 or to a backing layer 8, or a wear layer 6. This may also relate to an assembly of layers already laminated to each other, such as an already entirely or partially composed top layer 13, which, for example, comprises at least a decor film 7 and a wear layer 6, or at least a backing layer 8 and a decor film 7, or the backing layer 8, decor film 7 as well as the wear layer 6. A possible superficial lacquer layer preferably is provided after the press treatment. This is not represented here.

Although FIG. 3 represents two strewing devices 24, according to the invention it is not excluded that only one strewing device 24 is provided. This strewing device 24 then is applied for strewing the dry-blend 23.

It is also noted that the invention does not exclude that only one of the strewing devices 24 from FIG. 3 is applied for strewing a dry-blend 23, whereas the other strewing device 24 can be applied, for example, for strewing a granulate or for strewing thermoplastic material in any other form.

Also, the invention does not exclude that more than two strewing devices 24, for example, a third and a fourth strewing device, are provided.

Further, it is clear that, in case that a plurality of strewing devices 24 are applied, these strewing devices 24 can deposit thermoplastic material with a mutually different composition and/or average particle size.

It is also noted that the carrier 11 which is formed by means of the steps represented in FIG. 3 can be processed further for forming the final floor panels. So, a top layer can also be provided on top of this carrier 11, and the carrier itself can also be provided with a counter layer, as described in the introduction.

In FIG. 4, some steps are represented of an alternative, however, also preferred method according to the invention.

Two layers 9A-9B are strewn by means of the strewing devices 24. At least one of the two layers 9A-9B comprises a thermoplastic material strewn as a dry-blend 23. In the example, both layers 9A-9B comprise a strewn dry-blend 23. The strewing devices 24 strew the dry-blend 23 of the first layer 9A and the second layer 9A, respectively, onto the transport device 24 and the layer 9B.

Further, a glass fiber layer 12 is provided on the upper layer 9A. This glass fiber layer 12 can be supplied from on a roll.

Subsequently, the strewn layers 9A-9B, together with the glass fiber layer 12, are transported between the conveyor belts 31 and 32 along one or more heating devices 28. The heating devices 28 are applied for melting the layers 9A-9B or at least for melting them at least partially. Also, the heating devices 28 can be employed for foaming the layers 9A and/or 9B.

Thereafter, the layers 9A-9B, together with the glass fiber layer 12, are pressed by means of the press unit 33. The glass fiber layer 12 is bonded under pressure to the layer 9A by means of the adhesive properties of the molten layer 9A. the glass fiber layer 12 here is directly supported by a press element, such as a press platen or a pressing belt, as described as such in the document with application number U.S. Ser. No. 14/549,153. Subsequently, the layers 9A-9B and the glass fiber layer 12 are transported along cooling installations 29.

After the press treatment, in the example of FIG. 4 also a backing layer 8 is provided, being on the basis of thermoplastic material, with a preferably soft or supple thermoplastic. The thermoplastic material of the backing layer 8 is melted and pressed to a sheet, after which it is pressed together with the layers 9A-9B and the glass fiber layer 12 by means of calendering rolls 30.

The present invention is in no way limited to the herein above-described embodiments; on the contrary, such methods, floor panels and carrier material can be realized according to various variants, without leaving the scope of the present invention.

The invention claimed is:

1. A floor panel for forming a floor covering, wherein the floor panel comprises:
   a carrier consisting of a first layer on the basis of a first thermoplastic material and a single remaining layer thermally laminated to said first layer and formed by means of extrusion of a second thermoplastic material; and
   a top layer fused to the carrier, the top layer including at least a printed decor film and a wear layer,
   wherein said first thermoplastic material is free from plasticizers or comprises a plasticizer in an amount up to maximum 20 phr,
   wherein said first thermoplastic material is foamed or expanded and is reduced in weight of at least 40% of the weight of said first layer, and wherein said first thermoplastic material has a Fikentscher K-value of 85 or below;
   wherein said carrier is provided with a reinforcement layer;
   wherein said floor panel is provided on at least two opposite edges with coupling means which allow that two of such floor panels can be coupled to each other in such a manner that a locking is obtained in a vertical direction perpendicular to the plane of the coupled panels as well as in a horizontal direction perpendicular to the coupled edges and in the plane of the floor panel;

wherein the coupling means are provided substantially in the first and second thermoplastic materials of the carrier.

2. The floor panel of claim 1, wherein said reinforcement layer is a glass fiber cloth or glass fiber fleece.

3. The floor panel of claim 1, wherein said first thermoplastic material comprises plasticizer in an amount between 5 and 15 phr.

4. The floor panel of claim 1, wherein said top layer comprises a further thermoplastic layer.

5. The floor panel of claim 4, wherein said printed decor film is a printed synthetic material film.

6. The floor panel of claim 4, wherein said further thermoplastic layer is a thermoplastic backing layer based on one or a combination of polyvinyl chloride, polyethylene, polypropylene and/or polyurethane, and wherein said backing layer comprises inorganic fillers.

7. The floor panel of claim 5, wherein said further thermoplastic layer is a thermoplastic backing layer based on one or a combination of polyvinyl chloride, polyethylene, polypropylene and/or polyurethane, and wherein said backing layer comprises inorganic fillers.

8. The floor panel of claim 1, wherein said thermoplastic material is chosen from the list consisting of polyvinyl chloride, polyethylene, polypropylene, polyurethane and polyethylene terephthalate.

9. A floor panel for forming a floor covering, wherein the floor panel comprises:
 a carrier consisting of a first layer on the basis of a first thermoplastic material and a single remaining layer thermally laminated to said first layer and formed by means of extrusion of a second thermoplastic material; and
 a top layer fused to said carrier, wherein said top layer comprises a decor and a wear layer,
 wherein said first thermoplastic material is free from plasticizers or comprises a plasticizer in an amount up to maximum 20 phr, wherein said first thermoplastic material is polyvinyl chloride having a Fikentscher K-value of 85 or below;
 wherein said floor panel is provided on at least two opposite edges with coupling means which allow that two of such floor panels can be coupled to each other in such a manner that a locking is obtained in a vertical direction perpendicular to the plane of the coupled panels as well as in a horizontal direction perpendicular to the coupled edges and in the plane of the floor panels;
 wherein the coupling means is provided substantially in the first and second thermoplastic materials of the carrier.

10. The floor panel of claim 9, wherein said top layer comprises a thermoplastic backing layer based on one or a combination of polyethylene, polypropylene and/or polyurethane, and wherein said backing layer comprises inorganic fillers.

11. The floor panel of claim 9, wherein said decor is in the form of a print provided on a synthetic material film, wherein said synthetic material film is a polyethylene or a polypropylene film.

12. The floor panel of claim 9, wherein the first thermoplastic material of said carrier is foamed or expanded.

13. The floor panel of claim 12, wherein said first thermoplastic material is provided with a reinforcement layer defined as a glass fiber cloth or glass fiber fleece.

14. The floor panel of claim 11, wherein said wear layer is a polyethylene or a polypropylene film, thermally laminated to said synthetic material film.

* * * * *